J. M. LOW.
BUTTER CUTTER.
APPLICATION FILED JULY 27, 1912.
1,057,750.
Patented Apr. 1, 1913.
6 SHEETS—SHEET 6.
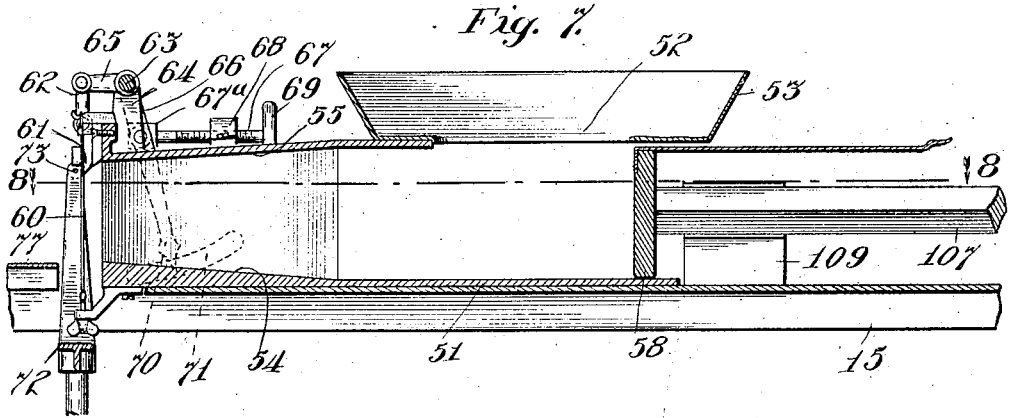
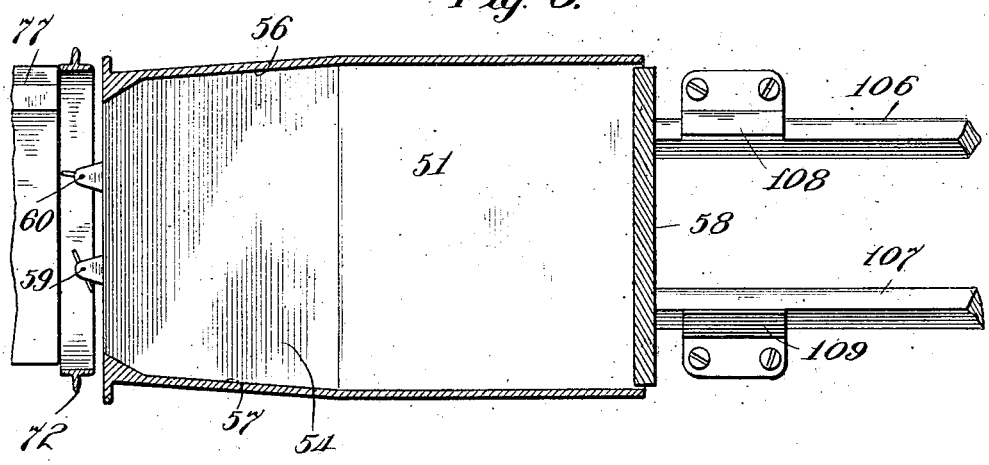
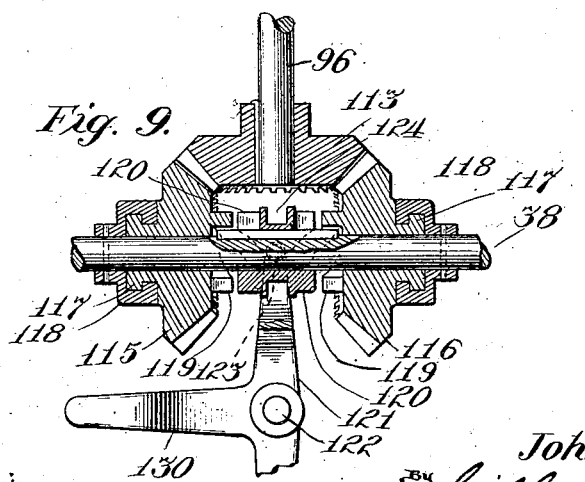

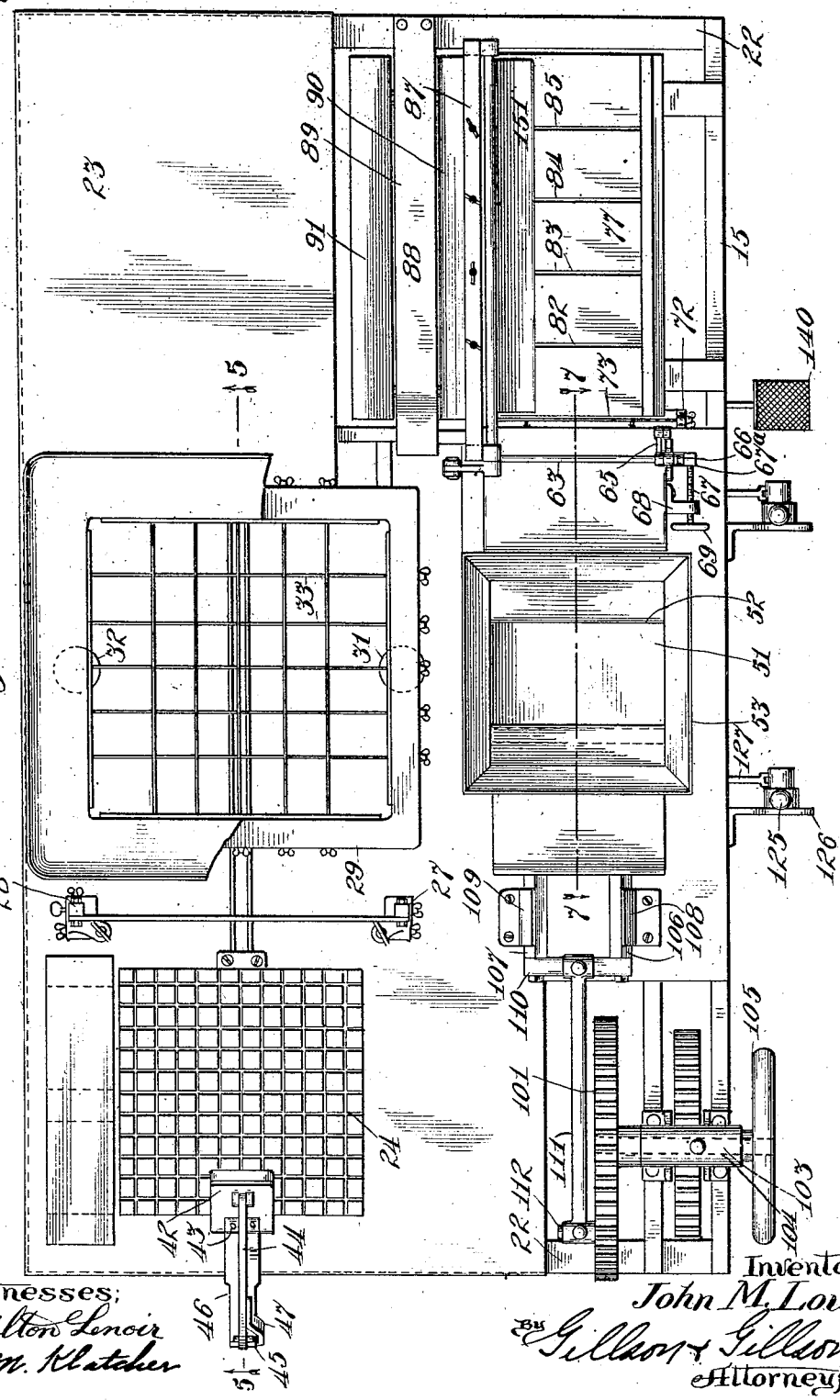

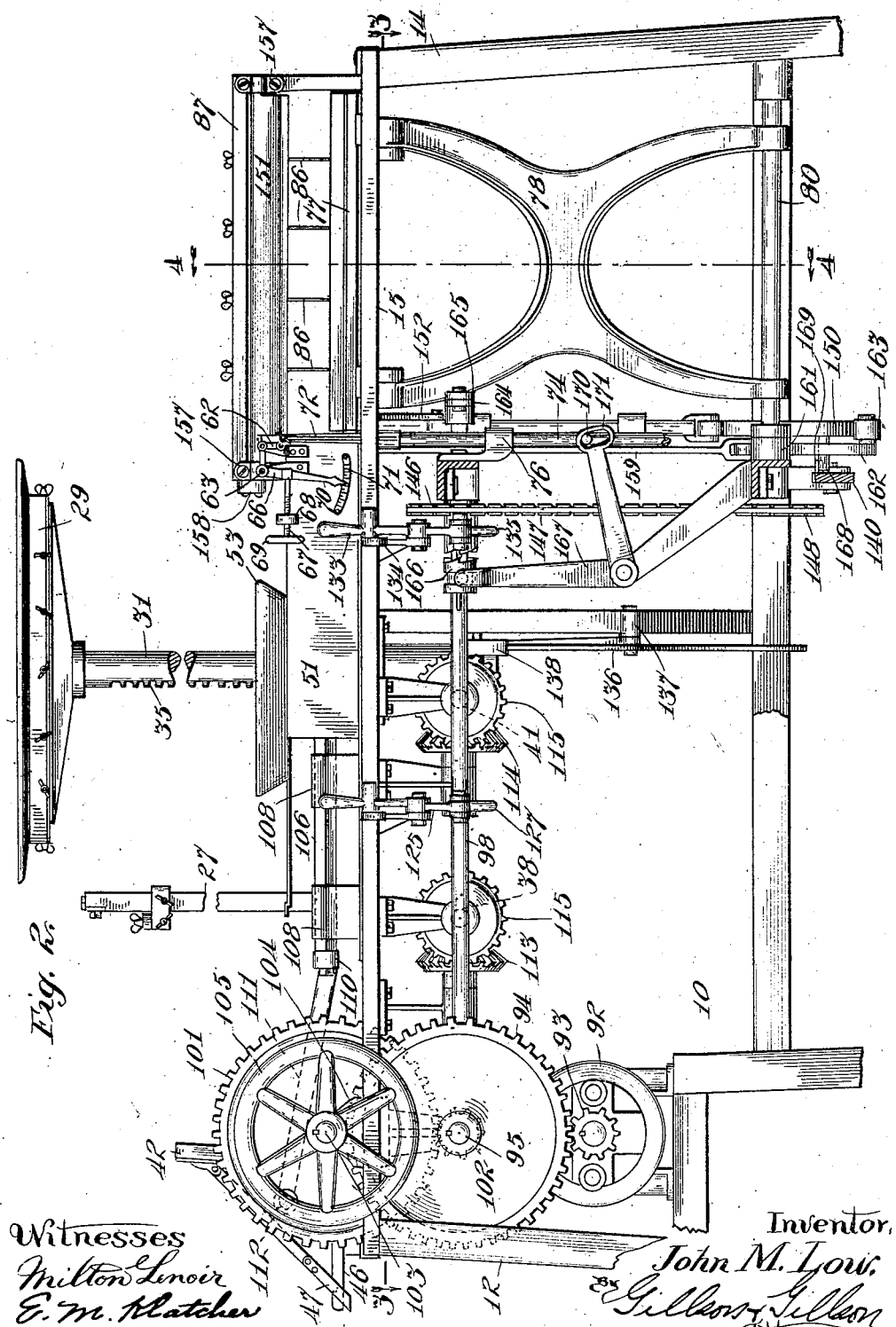

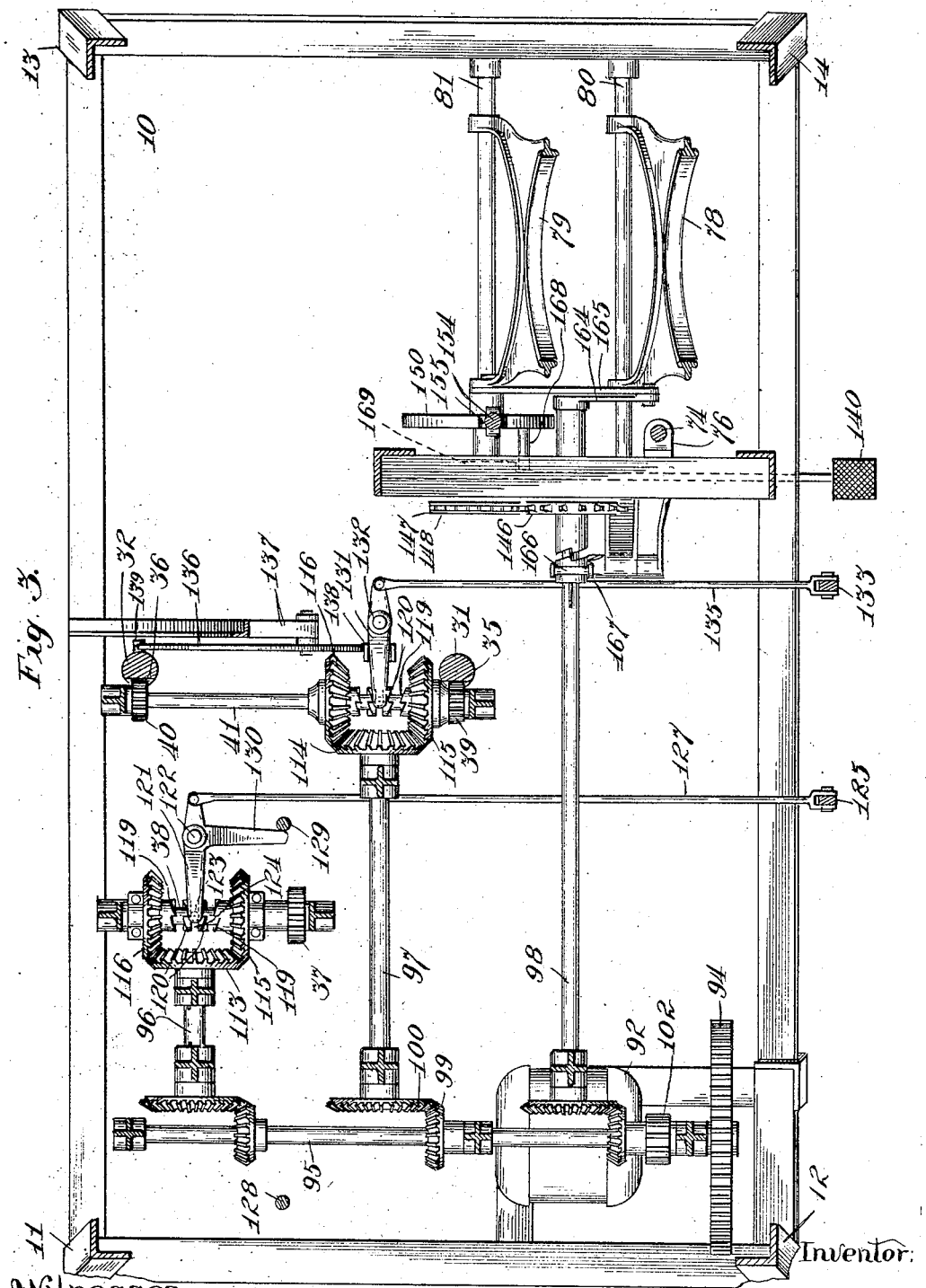

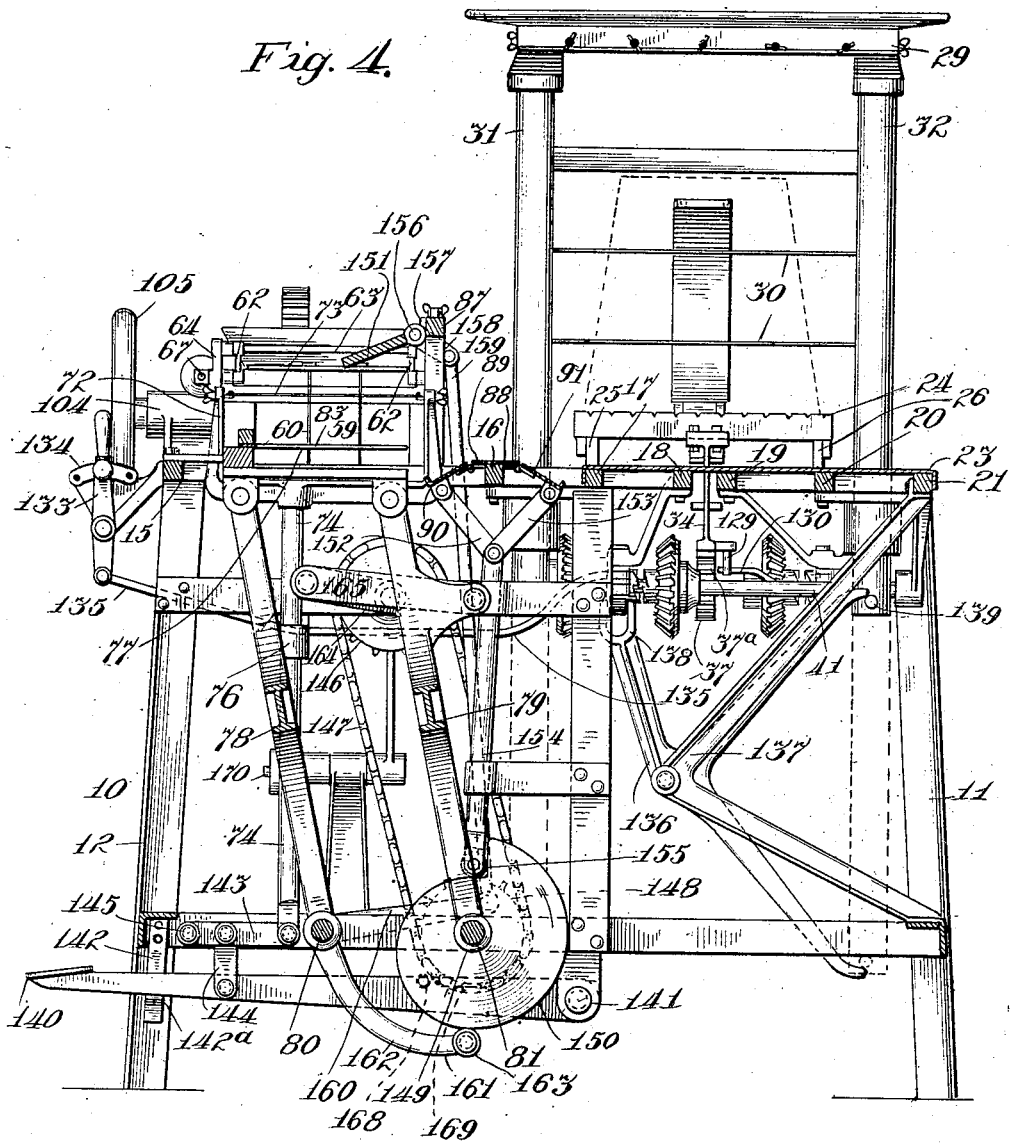

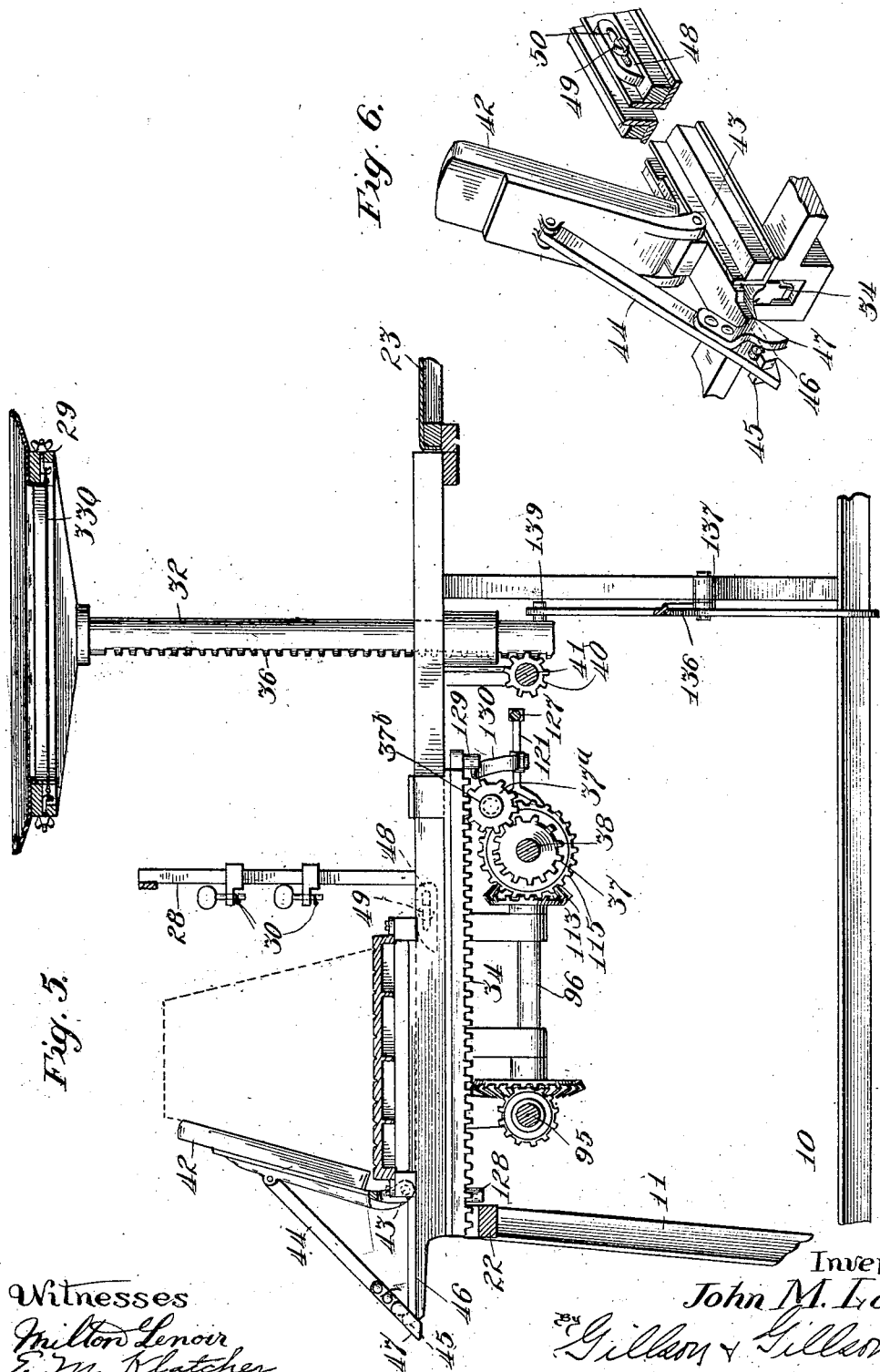

UNITED STATES PATENT OFFICE.

JOHN M. LOW, OF CHICAGO, ILLINOIS.

BUTTER-CUTTER.

1,057,750.  Specification of Letters Patent.  Patented Apr. 1, 1913.

Application filed July 27, 1912.  Serial No. 711,861.

*To all whom it may concern:*

Be it known that I, JOHN M. LOW, a citizen of the United States, and resident of Chicago, county of Cook, and State of Illinois, have invented certain new and useful Improvements in Butter-Cutters, of which the following is a specification, and which are illustrated in the accompanying drawings, forming a part thereof.

The invention relates to machines for dividing masses of butter into prints, and the object of the invention is to provide a butter cutting machine which shall be of simple and improved construction and efficient in operation.

The invention is exemplified in the structure which is hereinafter described, and which is illustrated in the accompanying drawings, wherein—

Figure 1 is a plan view of a butter cutting machine embodying the features of improvement provided by the invention; Fig. 2 is a side elevation of the same; Fig. 3 is a plan sectional view taken on the line 3—3 of Fig. 2; Fig. 4 is a transverse sectional view taken on the line 4—4 of Fig. 2; Fig. 5 is a detail longitudinal section taken on the line 5—5 of Fig. 1; Fig. 6 is a detail perspective view showing a form of trip which may be used upon the machine; Fig. 7 is a detail sectional view taken on the line 7—7 of Fig. 1; Fig. 8 is a detail plan section taken on the line 8—8 of Fig. 7; and Fig. 9 is a detail sectional view showing a form of reversing clutch which may be used upon the machine.

The machine illustrated in the drawings is adapted for working up the entire contents of a large tub or box of butter into prints of a regulated size and such as may be used for sale. To this end the main part of the large mass of butter is cut directly into prints of the required size, and the material which is thereby trimmed from the outer portions of the mass is compressed together and then cut into prints. A feature of the machine provides for the separation of the prints in order that they may be conveniently gotten out for wrapping.

The parts of the machine are preferably arranged upon a suitable supporting frame having the general form of a work table. Such a frame is indicated by the numeral 10 in the drawings. It comprises the uprights or legs shown at 11, 12, 13 and 14, the longitudinal rails shown at 15, 16, 17, 18, 19, 20 and 21, and transverse rails, one of which is shown at 22. A part of the frame 10 conveniently serves for supporting a bench or shelf, shown at 23, upon which the prints cut by the machine may be wrapped.

In the operation of the machine the mass of butter is first received upon a movable platen, shown at 24. This platen is supported upon ways 25, 26, and is movable thereon between standards 27, 28, to a position beneath a vertically movable cutter head 29. Cutting wires, as 30 (Fig. 4), extended between the standards 27 and 28, serve for horizontally dividing the mass of butter during the movement of the platen 24. The mass of butter is vertically divided by downward movement of the cutter head 29. To this end the cutter head 29 is mounted at the top of a pair of vertically movable posts 31, 32, and is provided with a series of transversely arranged cutting wires 33, all in a manner well known in the art.

For moving the platen 24 and cutter head 29, respectively, a gear-rack 34 is extended beneath and connected to the platen 24, and gear-racks 35 and 36 are formed upon the sides of the posts 31, 32. The gear-rack 34 is engaged by a pinion 37ª. This pinion turns upon a fixed bolt 37ᵇ, and is driven in either direction by being intermeshed with a gear 37 mounted upon an operating shaft 38. The gear-racks 35, 36, are respectively engaged by pinions 39, 40, both of which are mounted upon a horizontal operating shaft 41.

An abutment 42 is provided for preventing longitudinal displacement of the mass of butter on the platen 24 as it is moved against the cutting wires 30. As shown this abutment is hingedly connected to the platen 24 at 43 and normally extends upwardly from the rear edge of the same. Most desirably provision is made for releasing the abutment when it reaches the cutting wires 30, in order that the platen may pass under the wires to its position beneath the cutter head 29. As shown a prop 44 extends rearwardly from the abutment 42 and rests at its lower end against the upturned end 45 of a supporting arm 46. This supporting arm projects rearwardly from and moves with the platen 24. Tripping mechanism is provided for releasing the prop 44 when the abutment 42 reaches the cutting wires 30. Preferably this trip comprises a shoe 47 (Fig. 6) carried by the prop 44, and an adjustable lifting cam block 48. The cam block 48 serves for engaging the shoe 47 to raise its lower end out of engagement with the upturned end 45 of the arm 46 at a predetermined point in the travel of the platen 24. The cam block 48 is adjustably attached to a fixed part of the frame of the machine. As shown it is mounted upon the longitudinal rail 18 by the use of a screw 49 which passes through a slotted opening 50 in the cam block.

The respective movements of the platen 24 and cutter head 29 serve to divide the mass of butter into a number of completed prints and a quantity of irregularly shaped pieces of material. The completed prints are cut from the inner portions of the original mass, while the irregularly shaped pieces of material are trimmed from its outer portions. The completed prints may be directly transferred to the bench 23 for wrapping. The invention provides for also working the irregularly shaped pieces of material into prints through the use of a compression chamber 51 and cutting mechanism associated therewith. The compression chamber 51 is illustrated in detail in Figs. 7 and 8 of the drawings. It takes the form of a tube of rectangular cross-section, and is provided with a feed opening 52 at one side. As shown the feed opening 52 is fitted with a hopper 53. Irregularly shaped pieces of material are compressed into a continuous mass by being forced through the compression chamber 51. As shown the delivery end of the chamber is of such size and shape as to form the mass into a strip having a width and height equal to that of three completed prints of butter arranged side by side. Preferably the walls of the compression chamber adjacent its delivery end are made sloping, as at 54, 55, 56 and 57. A plunger 58 moves into the chamber 51 beneath the feed opening 52. In order that the strip of material delivered from the end of the chamber may be separated into prints of the required size, cutting wires, as 59, 60, are preferably vertically extended across the mouth of the chamber. An adjustably movable blade 61 is provided at the mouth of the chamber 51 for regulating the size of the prints. As shown, this blade is supported at its opposite ends upon links 62. For adjustably moving the blade a shaft 63 is extended transversely over the chamber 51 adjacent its mouth, and is journaled near its opposite ends in brackets 64. This shaft carries a pair of crank arms 65, and one of these crank arms is connected to each of the links 62. By turning the shaft 63 the height of the blade 61 is regulated. In order that this adjustment may be nicely regulated the shaft 63 carries an operating arm 66 adjacent one of its ends, and an adjusting screw 67 is provided for swinging the arm. The adjusting screw 67 has threaded engagement with a bracket 68 (Fig. 1) mounted upon a side wall of the chamber 51, and has a swiveled connection 67ª with the arm 66. A hand wheel 69 is mounted upon the outer end of the adjusting screw 67. The position of the blade 61 is conveniently indicated by extending the operating arm 66 beyond its point of connection with the adjusting screw 67, in the form of a pointer 70, and by mounting a graduated segment 71 upon a side wall of the compression chamber 51 to coöperate with the pointer.

A vertically movable yoke 72, carrying a cutting wire 73, serves for separating a quantity of the material which has been delivered at the mouth of the compression chamber 51. As most clearly shown in Fig. 4, the yoke 72 is mounted at the higher end of a vertically movable plunger 74. The plunger 74 is slidingly mounted in a bearing 76, the same being formed upon a fixed part of the frame 10.

A laterally movable transfer table 77, located beyond the yoke 72, receives the material as it is delivered from the mouth of the compression chamber 51. As shown, the table 77 is supported upon a pair of swinging frames 78, 79. The frames 78, 79, are pivotally mounted upon shafts 80 and 81, fixed in the frame 10. Preferably the transfer table 77 is provided with a plurality of slots, as 82, 83, 84 and 85 (Fig. 1). These slots extend inwardly from one edge of the table and serve for receiving a series of vertically arranged cutting wires 86 (Fig. 2), whereby the mass of butter delivered upon the table 77 is transversely divided into prints by lateral movement of the table. As shown, the cutting wires 86 are extended across a rigid frame 87. A sectional table 88 is located at one side of the frame 87 for receiving the material after it has been divided by the cutting wires 86. As shown, the table 88 comprises a rigid intermediate section 89, and a pair of swinging outer sections 90 and 91. The intermediate section 89 is conveniently mounted upon a fixed part of the frame of the machine, as upon the longitudinal rail 16, and the swinging outer sections 90 and 91 are hingedly connected to the intermediate section 89 at its opposite edges. Preferably the several parts of the table 88 are so proportioned in size that an intermediate series of prints delivered from the table 77 will rest upon the intermediate section 89, and other series of prints will rest upon the swinging sections 90 and 91, respectively, the line of division between the prints effected by the cutting wires 59 and 60 thereby substantially registering with the lines of connection between the sections 89, 90, and 89, 91, respectively. A downward swinging movement of the sections 90 and 91 of the table 88 will thus serve to separate the prints, where they may be readily grasped by the hand of an operator for transferring them from the table 88 to the bench 23 for wrapping.

Most desirably all of the operative parts of the machine will be actuated by power, except that the yoke 72 is preferably moved in one direction by an attendant. As shown, an electric motor 92 is supported upon a fixed part of the frame 10. Speed-reducing gears 93, 94, serve for communicating power from this motor to a countershaft 95. The countershaft 95 extends transversely across the frame 10 and serves for continuously driving a plurality of longitudinally arranged operating shafts 96, 97 and 98. As shown, the countershaft 95 is operatively connected with each of the operating shafts 96, 97 and 98, by means of a pair of beveled gears, as 99, 100. The operating shaft 96 serves for moving the platen 24. The operating shaft 97 serves for moving the cutter head 29. The operating shaft 98 serves for moving the transfer table 77 and operating the movable parts of the sectional table 88. This operating shaft also serves for raising the yoke 72.

A gear disk 101, driven by a pinion 102 mounted on the countershaft 95, serves for operating the plunger 58. As shown, the gear disk 101 is mounted upon one end of a shaft 103. The shaft 103 is journaled in a bracket 104 mounted upon the frame 10. A hand wheel 105, applied to one of the rotating parts of the machine, as the shaft 103, serves for turning the disk 101 when the motor 92 is not in operation, as when the machine has been stopped and it is desired to shift the position of the plunger 58.

When the machine is in operation the plunger 58 is continuously reciprocated. As shown, it is mounted at one end of a pair of reciprocating rods 106, 107. These rods have a longitudinal sliding movement in bearing brackets, as 108, 109. A cross-head 110 connects the rods 106, 107, at their outer ends. The gear disk 101 is equipped with a wrist pin 112, and a pitman 111 serves to operatively connect the wrist pin with the cross-head 110 to reciprocate the plunger 58.

Bevel gears 113 and 114 are mounted upon the ends of the operating shafts 96 and 97, respectively, and a pair of bevel gears 115, 116, is loosely mounted upon each of the shafts 38 and 41. The bevel gears 115 and 116 of each pair mesh with the corresponding bevel gears 113, 114, upon opposite sides. The beveled gears 115, 116, of each pair are thereby continuously driven in opposite directions. As shown, each of the bevel gears 115, 116, is fixed against longitudinal movement on the corresponding shaft 38, 41, by having a flanged hub 117 over which is fitted a collar 118. Each of the collars 118 is pinned to the corresponding shaft 38, 41, and is internally grooved to receive the flanged hub 117 of the corresponding bevel gear 115, 116. The adjacent faces of the bevel gears 115, 116, of each pair are provided with clutch teeth 119, and a clutch member 120, splined upon the corresponding shaft 38, 41, plays between each pair of bevel gears. By this means the shafts 38 and 41 may be rotated in either direction by a movement of the clutch member to one or the other of its extreme positions, and the movement of the shafts 38, 41, may be arrested by shifting the corresponding clutch member to an intermediate position.

Provision is preferably made for manually shifting each of the clutch members 120 from its intermediate position to its extreme positions, and for automatically restoring these clutch members to their intermediate positions when the parts operated by the corresponding shaft 38, 41, have completed their movement in each direction. As shown, a shipper arm 121 is provided for moving that one of the clutch members 120 which is splined upon the shaft 38. This shipper arm is pivoted at 122 upon a fixed part of the frame 10. One of its ends is operatively connected to the corresponding clutch member 120 in a well known manner, as by being bifurcated to straddle the clutch member, and by being provided with instanding pins, as 123, which enter a circumferential groove 124 in the clutch member. A hand lever 125 is provided for swinging the shipper arm 121 to start the movement of the shaft 38 in either direction. As shown, this hand lever is located in a conveniently accessible position at one side of the machine, as by being pivotally mounted upon a bracket arm 126 secured to the longitudinal rail 15. The lower end of the hand lever 125 is connected to the shipper arm 121 by a link 127 (Fig. 3). Stop pins 128 and 129 depend from the gear-rack 34 adjacent its opposite ends for swinging the shipper arm 121 when the platen 24 has completed its movement in either direction. For coöperating with these stop pins a crank arm 130, formed integral with the shipper lever 121, projects laterally therefrom into the path of the pins. A second shipper lever 131 is provided for shifting that one of the clutch members 120 which is splined upon the shaft 41. This shipper arm is pivotally mounted upon a fixed part of the frame 10, as at 132 (Fig. 3), and is connected to the corresponding clutch member 120 in the same manner as is provided for connecting the shipper arm 121 to the other one of the clutch members 120. A hand lever 133 is provided for moving the shipper arm 131 to throw the corresponding clutch member 120 into engagement with either one of that pair of bevel gears 115, 116, which is mounted on the shaft 41. As shown, the hand lever 133 is mounted adjacent the hand lever 125, as by being pivotally secured to a bracket arm 134 carried by the side rail 15 adjacent the bracket arm 126. A link 135 serves for connecting the hand lever 133 with the shipper arm 131.

A three-arm lever 136 may be used for automatically moving the shipper arm 131. This lever is pivotally mounted to swing in a vertical plane, as by being attached to a bracket member 137 (Fig. 4) of the frame 10. One of the arms of the lever 136 is bifurcated, as indicated at 138, to straddle the shipper arm 131. The other two arms of the lever 136 extend into the path of a stop pin 139. This stop pin is mounted upon the vertically movable post 132 adjacent its lower end.

The yoke 72 carrying the cutting wire 73 is preferably moved downwardly for its cutting stroke by a treadle 140. As shown, this treadle is pivoted to a fixed part of the frame of the machine, as at 141 (Fig. 4). A spring clip 142, mounted upon a part of the frame 10 and having a hooked lower end 142ª, serves for normally holding the treadle in raised position. A crank arm 143 and a link 144 serve for operatively connecting the treadle 140 with the plunger 74 for moving the yoke 72. The crank arm 143 is pivoted at one end to a fixed part of the frame of the machine, as at 145. Its other end is connected to the lower end of the plunger 74. The link 144 is connected at its opposite ends to the treadle 140 and the link 144, respectively. The treadle 140 preferably also serves to operate a clutch for controlling the movement of the transfer table 77. As shown, a sprocket wheel 146, having a clutch-engaging face upon one side, is loosely mounted on the shaft 98 adjacent one end. A sprocket chain 147 turns over the sprocket wheel 146 and over a second sprocket wheel 148. The sprocket wheel 148 is mounted upon a tubular shaft 149 which turns upon the pivot rod 81. The tubular shaft 149 carries an operating cam 150 (Fig. 4). The operating cam 150 conveniently serves both for operating the movable parts of the sectional table 88 and for controlling the movement of a swinging gate 151. The movable parts 90 and 91 of the sectional table 88 are connected by links 152, 153, to the higher end of a vertically movable plunger 154. The plunger 154 carries a cam roller 155, which rides upon the operating cam 150. The swinging gate 151 is provided for stripping the butter from the transfer table 77 onto the receiving table 88, during the return movement of the transfer table. As shown, it is pivotally mounted at its upper edge, as by being provided with a pintle 156 journaled in bearing lugs 157 formed on a side of the frame 87. A crank arm 158 is mounted on the pintle 156, and is connected by a link 159 to one of the arms 160 of a bell crank lever 161. The bell crank lever 161 is pivotally mounted upon a fixed part of the frame of the machine, as upon the pivot rod 80. The other arm 162 of the bell crank lever 161 carries a cam roller 163 which rides upon the operating cam 150. The movable transfer table 77 is conveniently operated by a crank arm 164 formed integral with the sprocket wheel 146. This crank arm is connected by a link 165 to one of the swinging frames, as 79, which support the table 77. A clutch 166 is splined upon the shaft 98 and coöperates with the clutch face of the sprocket wheel 146. This clutch member is shifted by movement of the treadle 140, as through a bell crank lever 167 having one of its arms connected to the clutch member and its other arm operatively connected to the plunger 74. Preferably provision is made for automatically raising the treadle 140 when the crank arm 164 and operating cam 150 have been turned through one complete revolution. To this end a pin 168 is carried by the operating cam 150 and projects laterally therefrom toward the treadle. A cam ledge 169, formed on the treadle, is engaged by this pin to raise the treadle.

In order that rotation may not be imparted to the sprocket wheel 146 to move the transfer table 77 until the butter held thereon has been separated from the mass contained within the compressed chamber 51, as by downward movement of the cutting wire 73, the bell crank lever 167 is connected to the plunger 74 by a pin 170 carried by the plunger and moving in a slot 171 formed in the lever. By this means the bell crank lever 167 is not moved to bring the clutch member 166 into engagement with the clutch face of the sprocket wheel 146 until the treadle 140 has been depressed far enough to move the cutting wire 73 downwardly through the mass of butter at the mouth of the compression chamber 51. Similarly, when the treadle 140 is raised by the engagement of the pin 168 with the cam ledge 169, the bell crank lever 167 is not moved to disengage the clutch member 166 from the clutch face of the sprocket wheel 146 until the parts are substantially in that position at which it is desired they should be brought to rest.

I claim as my invention—

1. In a butter cutter, in combination, a tapering tubular compression chamber open at its smaller end, a cutting strand movable across the said end opening of the chamber, a laterally reciprocable transversely slotted table located beyond the said end opening of the chamber, and a plurality of vertically arranged cutting strands supported in the path of the table in line with its said slots.

2. In a butter cutter, in combination, a table comprising a pair of oblong rectangular hingedly connected sections, cutting means operable upon a mass of butter to divide it upon a vertical line, means for delivering the said mass of butter upon the table with the said line of division substantially in register with the hinge line between the said sections, and means for swinging one of the said sections of the table downwardly to separate the parts of the said mass of butter.

3. In a butter cutter, in combination, a plurality of hingedly connected sections forming a flexible receiving table, a reciprocable feed table movable laterally over the said receiving table, a swinging gate movable into the path of the load carried by the feed table, means for reciprocating the feed table, a cam adapted to make one complete revolution during each reciprocation of the feed table, said cam comprising an inclined elevated portion extending for half of its circumference and an elevated dwell portion extending for the remainder of said circumference, and a pair of cam shoes engaging the said cam upon opposite sides, one of the said cam shoes being operatively connected to the said swinging gate and the other of said cam shoes being operatively connected to a movable section of the said receiving table.

4. In a butter cutter, in combination, a horizontally disposed tapered tubular compression chamber open at its smaller end, a cutting strand extending vertically across the said open end of the compression chamber, a pair of hingedly connected leaves forming a flexible receiving table located beyond and at one side of the said open end of the compression chamber, a reciprocable table movable between positions in which it is in front of the open end of the compression chamber and in which it is over the said receiving table, respectively, a swinging gate movable into the path of the load carried by the said reciprocable table, means for operating the reciprocable table, means for swinging the gate upon the return of the reciprocable table, and means for swinging one of the leaves of the receiving table when the said reciprocable table has completed its said cycle of movement.

5. In a butter cutter, in combination, a tubular compression chamber having an open end of rectangular shape, a blade extending across one side of the said end opening of the chamber and adjustably movable toward the remote side of said opening for regulating the size of the opening, and means for maintaining the blade parallel to the said remote side of the opening during its movement.

6. In a butter cutter, in combination, a tubular compression chamber open at one end, a cutting strand movable across the said end opening of the chamber, a laterally reciprocable transversely slotted table located beyond the said end opening of the chamber, a vertically arranged cutting strand supported in the path of the table in line with its said slot, and a gate movable into the path of the load carried by the said table.

7. In a butter cutter, in combination, a horizontally disposed tubular compression chamber open at one end, a cutting strand extending vertically across the said end opening of the compression chamber, a laterally reciprocable transversely slotted table located beyond the said end opening of the compression chamber, and a vertically arranged cutting strand in the path of the said table in line with its said slot.

8. In a butter cutter, in combination, a cutting strand, a reciprocable table movable by the strand and a gate movable into the path of the load carried by the table during the movement of said table in one direction.

9. In a butter cutter, in combination, a plurality of cutting strands arranged in a common plane, a reciprocable table movable across the plane of the strands and a gate movable into a plane parallel with and adjacent the plane of the strands during the movement of the table in one direction.

10. In a butter cutter, in combination four cutters and a tubular compression chamber having an open end of rectangular shape, three of the cutters acting in relatively perpendicular planes and the other cutter acting across the said open end of the tubular compression chamber.

11. In a butter cutter, in combination, four sets of parallel cutting strands, a tubular compression chamber having an open end of rectangular shape and a receiving table located beyond the said end opening of the tubular compression chamber, three of the said sets of parallel cutting strands acting in relatively perpendicular planes and the other of said sets of cutting strands and the said receiving table being relatively movable in a direction transverse to the axis of the said tubular compression chamber.

12. In a butter cutter, in combination, a tubular compression chamber having an open end of rectangular shape and cutting means acting in four planes, three of said planes being relatively perpendicular and the other of said planes being perpendicular to the axis of the said tubular compression chamber.

13. In a butter cutter, in combination, a tubular compression chamber having an open end of rectangular shape a cutting strand extending across the said open end of the compression chamber parallel with two of the sides of said opening, a blade extending across one of the other sides of the said end opening of the chamber and adjustably movable toward the fourth side of the opening for regulating the side of the opening, and means for maintaining the blade parallel to the said fourth side of the opening during its said movement.

14. In a butter cutter, in combination, a tubular compression chamber having an open end of rectangular shape, one side of the chamber being inwardly movable for regulating the size of the opening, a regulating shaft extending transverse to the axis of the chamber and operative connection between each end of the shaft and the adjacent part of the inwardly movable side of the chamber.

JOHN M. LOW.

Witnesses:
CHARLES B. GILLSON,
E. M. KLATCHER.